(12) United States Patent
Murase (10) Patent No.: US 9,764,656 B2
(45) Date of Patent: Sep. 19, 2017

(54) ELECTRICALLY DRIVEN VEHICLE

(71) Applicant: HONDA MOTOR CO., LTD., Tokyo (JP)

(72) Inventor: Hiroyuki Murase, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/183,798

(22) Filed: Jun. 16, 2016

(65) Prior Publication Data

US 2016/0368395 A1 Dec. 22, 2016

(30) Foreign Application Priority Data

Jun. 17, 2015 (JP) ................................. 2015-121826

(51) Int. Cl.
- B60L 15/00 (2006.01)
- B60K 1/04 (2006.01)
- B60K 6/40 (2007.10)
- B60K 1/00 (2006.01)

(52) U.S. Cl.
CPC .............. *B60L 15/007* (2013.01); *B60K 1/04* (2013.01); *B60K 6/40* (2013.01); *B60K 2001/003* (2013.01); *B60L 2210/10* (2013.01); *B60L 2210/40* (2013.01); *B60Y 2200/92* (2013.01); *B60Y 2400/61* (2013.01)

(58) Field of Classification Search
CPC ...... B60K 2001/0416; B60K 2001/005; B60L 11/1812
USPC ....................................................... 180/68.5
See application file for complete search history.

(56) References Cited

U.S. PATENT DOCUMENTS

| | | | | |
|---|---|---|---|---|
| 2004/0159478 A1* | 8/2004 | Masuda | .................... | B60K 1/00 180/65.22 |
| 2008/0062622 A1* | 3/2008 | Fukazu | .................... | B60K 1/04 361/678 |
| 2008/0193832 A1* | 8/2008 | Doffin | ................. | H01M 2/1072 429/122 |
| 2011/0011654 A1* | 1/2011 | Kubota | .................... | B60K 1/04 180/65.21 |
| 2011/0222240 A1* | 9/2011 | Kawata | .................... | B60L 3/00 361/690 |
| 2014/0079977 A1* | 3/2014 | Tsujimura | ........... | H01M 2/1077 429/120 |
| 2014/0124277 A1* | 5/2014 | Kurakawa | ........... | H01M 2/1083 180/65.1 |
| 2014/0295216 A1* | 10/2014 | Matsuda | ............. | H01M 2/1083 429/7 |

(Continued)

FOREIGN PATENT DOCUMENTS

JP 2007-131237 5/2007

*Primary Examiner* — Jeffrey J Restifo
(74) *Attorney, Agent, or Firm* — Mori & Ward, LLP (57) ABSTRACT

An electrically driven vehicle includes a first electrical apparatus, a second electrical apparatus, a low-voltage electrical circuit, a relay terminal block, and a high-voltage cable. The low-voltage electrical circuit is connected to the first electrical apparatus. The relay terminal block is positioned in the low-voltage electrical circuit so as to be electrically connected to the first electrical apparatus. A space is provided between the relay terminal block and the first electrical apparatus. The high-voltage cable is connected to at least one of the second electrical apparatus and the first electrical apparatus and is provided to pass through a space.

11 Claims, 6 Drawing Sheets

(56) References Cited

U.S. PATENT DOCUMENTS

2015/0208556 A1\* 7/2015 Kodama ................. B60L 3/003
　　　　　　　　　　　　　　　　　　　　　363/123
2016/0368394 A1\* 12/2016 Murase ................. B60L 15/007
2016/0368395 A1\* 12/2016 Murase ................. B60L 15/007

\* cited by examiner

FIG. 5

ELECTRICALLY DRIVEN VEHICLE

CROSS-REFERENCE TO RELATED APPLICATIONS

The present application claims priority under 35 U.S.C. §119 to Japanese Patent Application No. 2015-121826, filed Jun. 17, 2015, entitled "Electrically Driven Vehicle." The contents of this application are incorporated herein by reference in their entirety.

BACKGROUND

1. Field

The present disclosure relates to an electrically driven vehicle.

2. Description of the Related Art

For example, an electrically driven vehicle such as a hybrid vehicle or an EV includes plural high-voltage electrical apparatuses such as an inverter that controls a traction motor and a DC-DC converter for voltage control. A high-voltage cable is connected with those high-voltage electrical apparatuses. Thus, it is desired to avoid application of an excessively large load to the high-voltage cable in collision of the vehicle.

Accordingly, for example, Japanese Unexamined Patent Application Publication No. 2007-131237 discloses a protection structure for a high-voltage cable. This protection structure is installed in a vehicle and includes first and second electrical components that are separately arranged at an interval from each other. A resin-molded protector is provided to at least a partial section on a path of the cable that extends between the first electrical component and the second electrical component. A tube member that surrounds a periphery of the cable and flexibly curves along the direction in which the cable extends is provided inside the resin-molded protector.

Japanese Unexamined Patent Application Publication No. 2007-131237 discloses that an external force applied to the cable is reduced by the resin-molded protector and the tube member and application of an excessively large impact to the cable in collision of the vehicle may thus be avoided.

SUMMARY

According to a first aspect of the present invention, an electrically driven vehicle that is driven by at least a motor, the electrically driven vehicle includes a first electrical apparatus, a second electrical apparatus, and a relay terminal block, which are mutually adjacently arranged. The first electrical apparatus is connected with a third electrical apparatus that is separately arranged from the first electrical apparatus via a low-voltage electrical circuit. The relay terminal block is positioned in an intermediate portion of the low-voltage electrical circuit and on an outer side of the vehicle than the first electrical apparatus and is electrically connected with the first electrical apparatus. A high-voltage cable is connected with at least the second electrical apparatus or the first electrical apparatus. The high-voltage cable passes through a space that is formed between the relay terminal block and the first electrical apparatus in a plan view from above of the vehicle.

According to a second aspect of the present invention, an electrically driven vehicle includes a first electrical apparatus, a second electrical apparatus, a low-voltage electrical circuit, a relay terminal block, and a high-voltage cable. The low-voltage electrical circuit is connected to the first electrical apparatus. The relay terminal block is positioned in the low-voltage electrical circuit so as to be electrically connected to the first electrical apparatus. A space is provided between the relay terminal block and the first electrical apparatus. The high-voltage cable is connected to at least one of the second electrical apparatus and the first electrical apparatus and is provided to pass through a space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
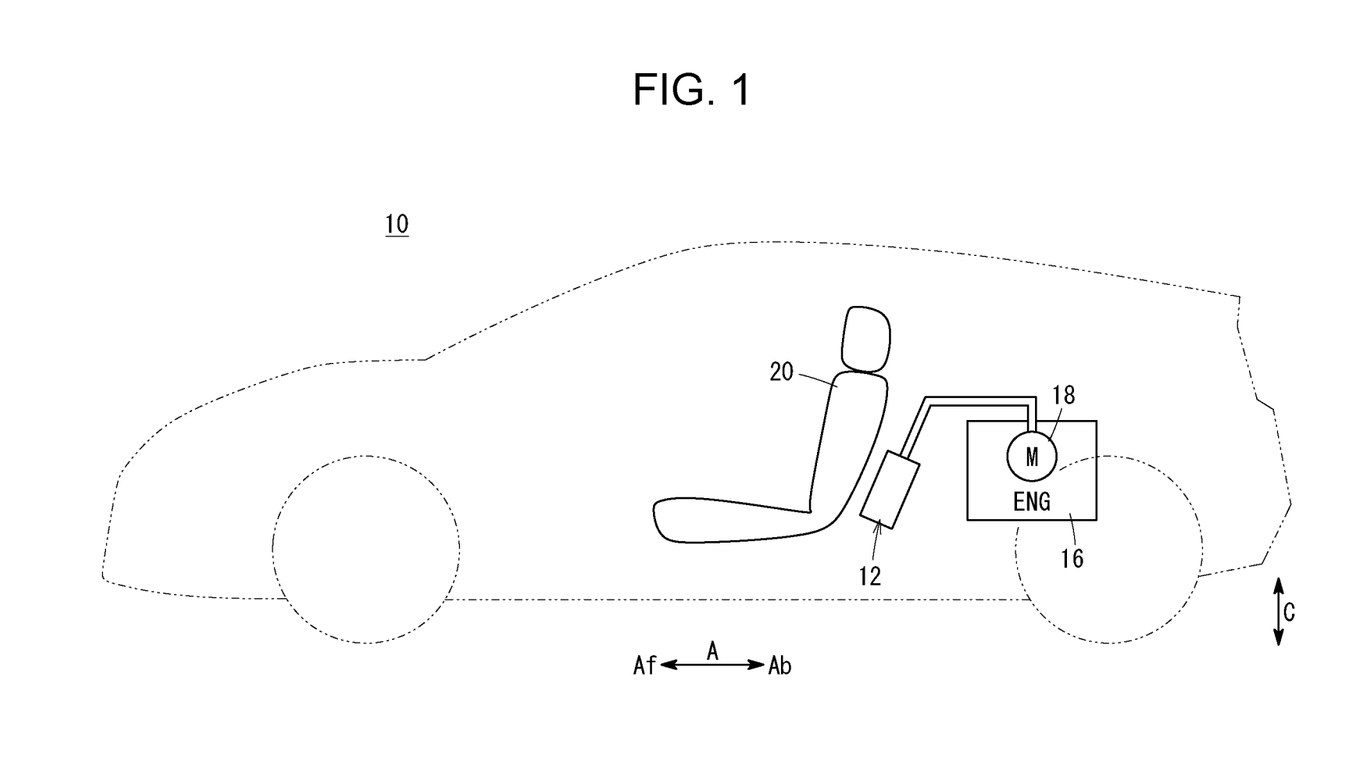
FIG. 1 is a schematic side view of an electrically driven vehicle according to an embodiment of the present disclosure.

As illustrated in FIG. 1, an electrically driven vehicle 10 according to an embodiment of the present disclosure is a hybrid vehicle, an EV, or the like, in which an electrical unit 12 is installed.

An engine 16 and a motor 18 are coupled together in the electrically driven vehicle 10. The engine 16 and the motor 18 are provided in the rear of a seat 20 (in the arrow Ab direction) (in the rear in the arrow A direction that is the vehicle longitudinal direction) but may be provided in a front box in the front in the vehicle longitudinal direction (the arrow Af direction). The motor 18 is a three-phase DC brushless motor, for example.

Figure 2:
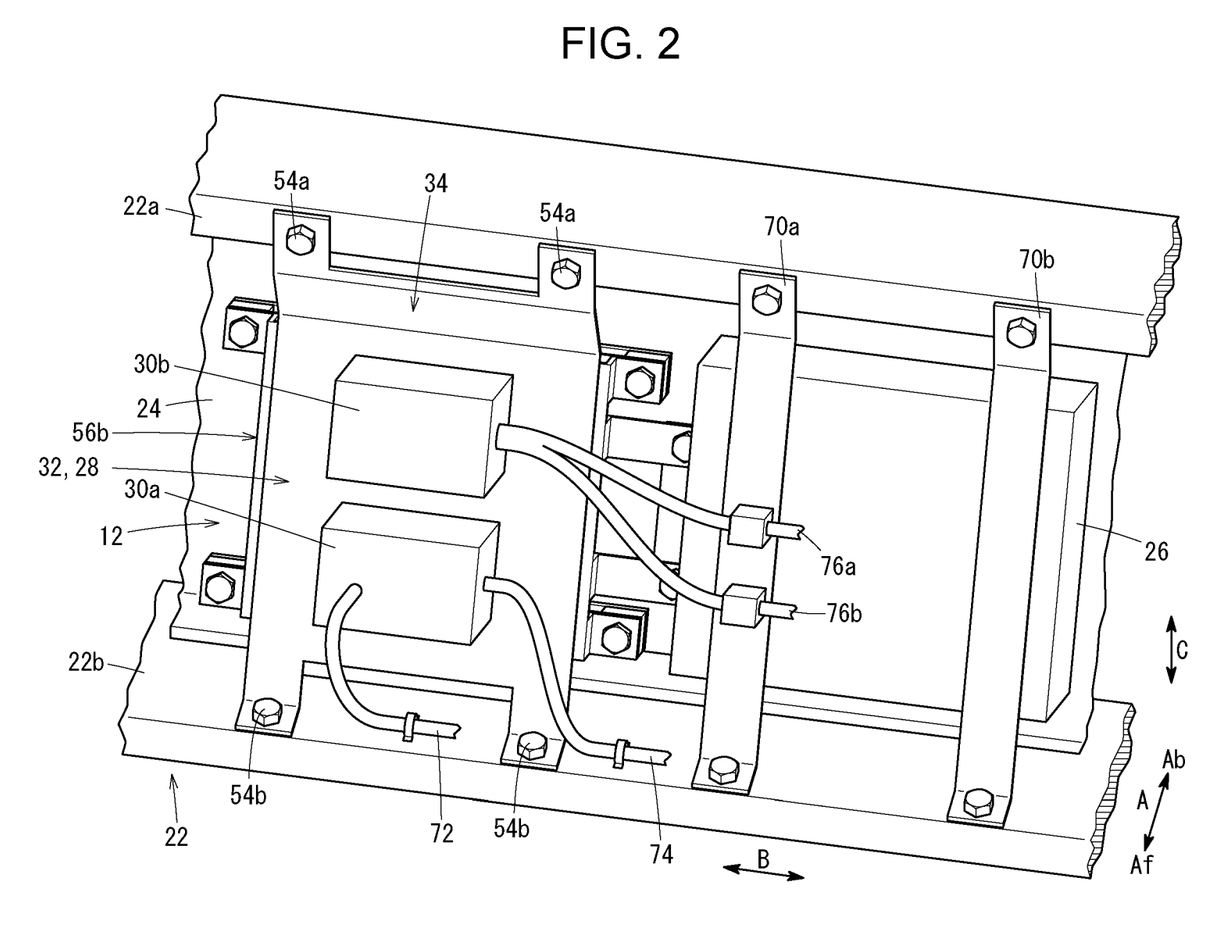
FIG. 2 is a perspective explanation diagram of an electrical unit that configures the electrically driven vehicle.
Figure 3:
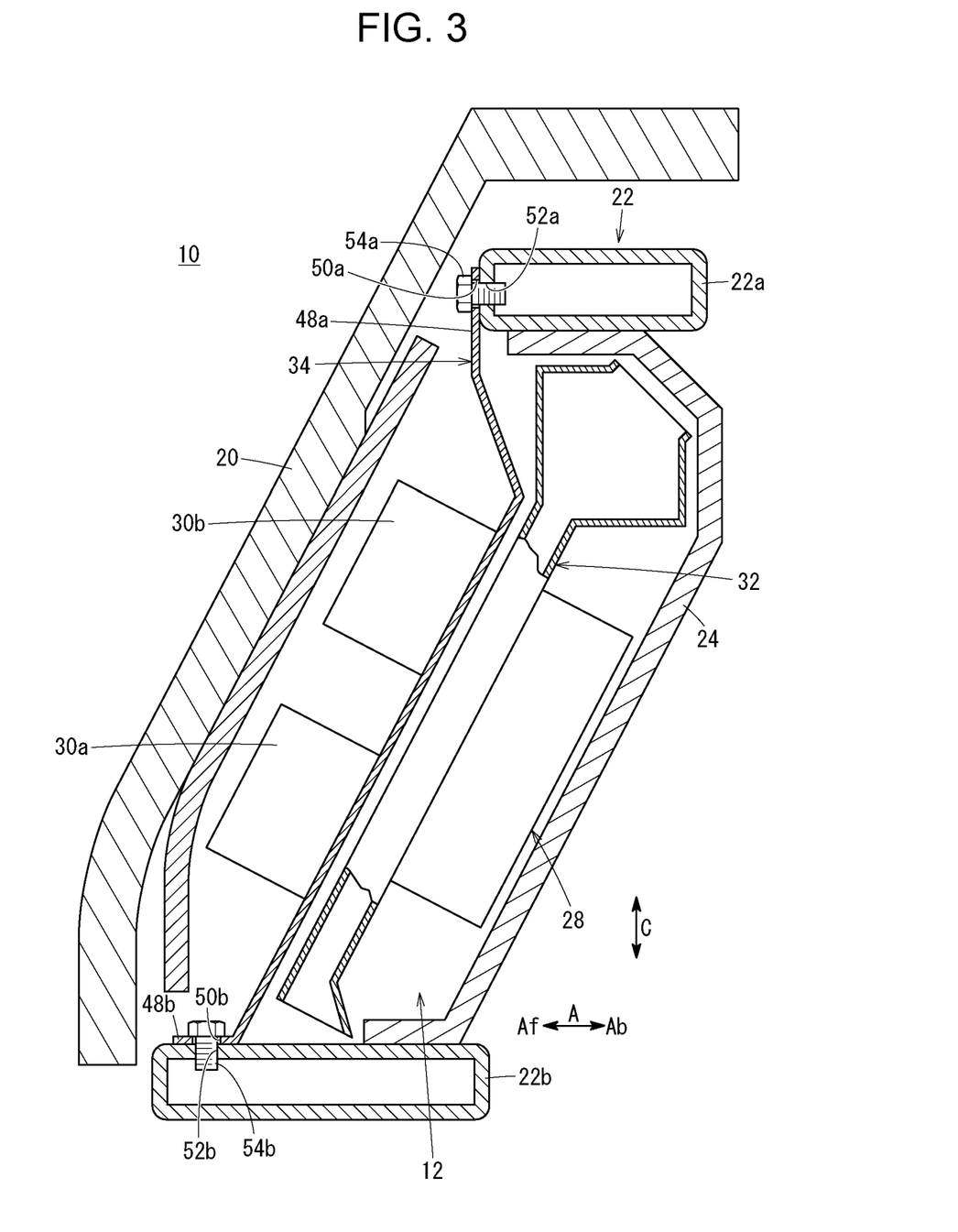
FIG. 3 is a cross-sectional side view of the electrical unit.

As illustrated in FIGS. 2 and 3, the electrically driven vehicle 10 is provided with a vehicle frame 22 in the rear of the seat 20. The vehicle frame 22 has an upper frame 22a and a lower frame 22b, each of which extends in the vehicle width direction (the arrow B direction in FIG. 2). An electrical component box 24 is arranged between the upper frame 22a and the lower frame 22b. The electrical component box 24 houses the electrical unit 12 and a battery module 26 (see FIG. 2). The electrical component box 24 is employed as needed and may not have to be used.

Figure 4:
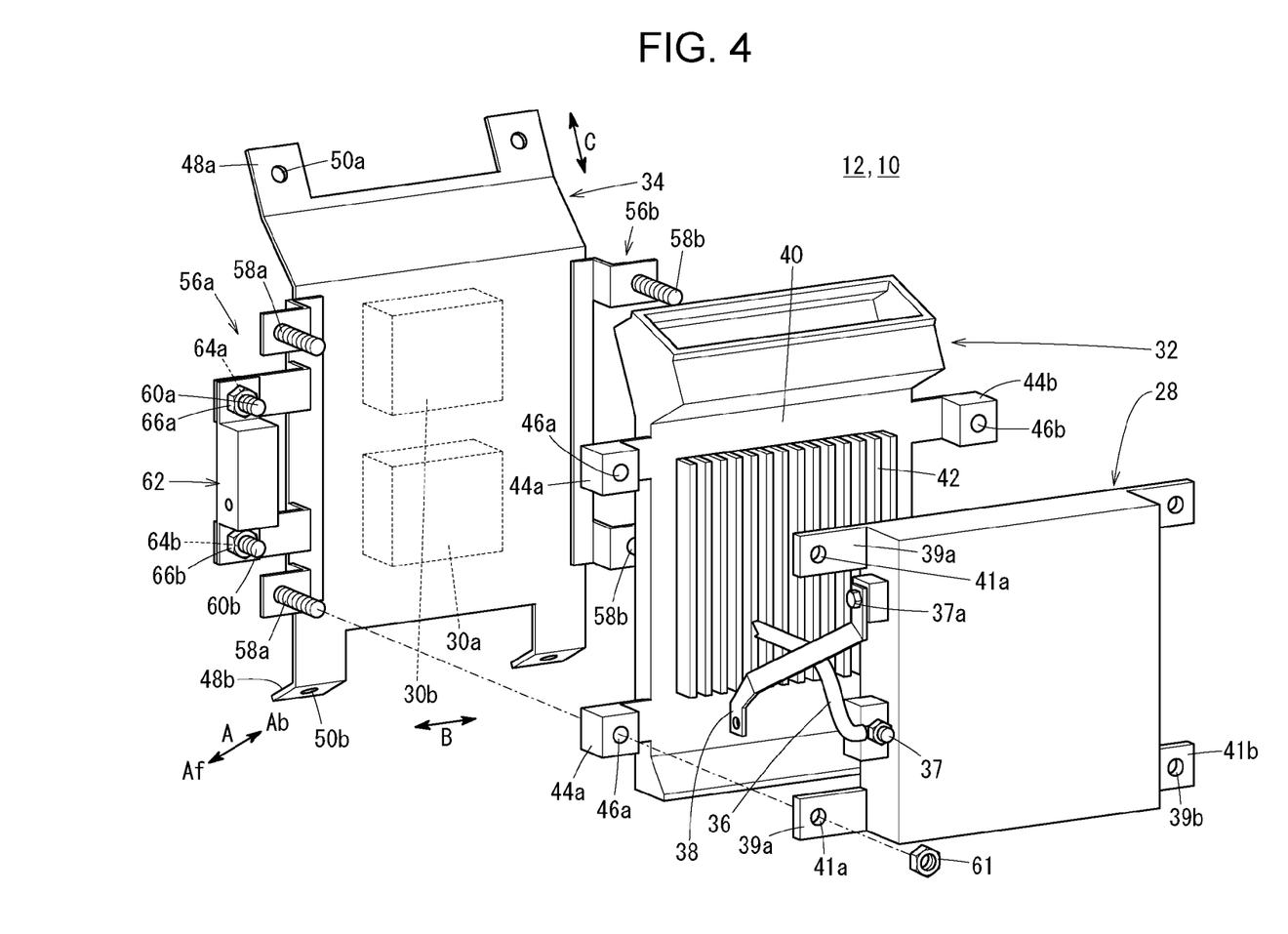
FIG. 4 is a perspective explanation diagram of the electrical unit, in which principal components are exploded.

As illustrated in FIGS. 3 and 4, the electrical unit 12 includes plural electrical apparatuses such as a DC-DC converter (first electrical apparatus) 28 and junction boxes (junction boards) (second electrical apparatuses) 30a and 30b, for example, and electrical apparatuses in addition, which are not illustrated. The electrical unit 12 is provided with a cooling structure 32 and is fixed to the vehicle frame 22 via a bracket 34 (see FIGS. 2 and 3). In the electrical unit 12, the junction boxes 30a and 30b, the bracket 34, the cooling structure 32, and the DC-DC converter 28 are arranged rearward from the seat 20 side (in the arrow Ab direction) in this order (see FIG. 3).

As illustrated in FIG. 4, a high-voltage cable 36 connected with an inverter (high-voltage electrical apparatus), which is not illustrated, is connected with a side portion on one end side of the DC-DC converter 28 in the arrow B direction via a bolt 37. The high-voltage cable 36 is connected with the junction box 30a or 30b.

A low-voltage conductor that configures a low-voltage electrical circuit, for example, one end of a busbar 38 is connected with a side portion of the DC-DC converter 28 via a bolt 37a. The low-voltage electrical circuit is electrically connected with the DC-DC converter 28 and low-voltage (for example, 12 V) auxiliary apparatuses (third electrical apparatuses), which are not illustrated.

Mount portions 39a and 39b are formed to swell out at both ends of the DC-DC converter 28 in the vehicle width direction (the arrow B direction). The mount portions 39a and 39b are in plate shapes and are respectively provided with hole portions 41a and 41b.

The cooling structure 32 has a duct member 40 that is formed of a non-metal material, for example, a resin material. The DC-DC converter 28 is provided with plural cooling fins 42. The cooling fins 42 are arranged in the duct member 40. Mount portions 44a and 44b are formed to swell out at both ends of the duct member 40 in the vehicle width direction (the arrow B direction). The mount portions 44a and 44b are in block shapes and are respectively provided with hole portions 46a and 46b.

The bracket 34 is in a plate shape, and a pair of upper side fixing portions 48a is formed in upper portions of the bracket 34. The upper side fixing portion 48a is inclined forward at a relatively small angle and is provided with a hole portion 50a. A pair of lower side fixing portions 48b is formed in lower portions of the bracket 34. The lower side fixing portion 48b is inclined forward at a relatively large angle and is provided with a hole portion 50b.

As illustrated in FIG. 3, in the upper frame 22a, a pair of threaded holes 52a is formed coaxially with the pair of the hole portions 50a and to be directed in the horizontal direction. In the lower frame 22b, a pair of threaded holes 52b is formed coaxially with the pair of the hole portions 50b and to be directed in the vertical direction.

The screws 54a and 54b are inserted in the hole portions 50a and 50b and respectively screwed with the threaded holes 52a and 52b, and the bracket 34 is thereby fixed to the vehicle frame 22. In a case where the bracket 34 is fixed to the vehicle frame 22, the upper side fixing portions 48a are arranged to be parallel with the horizontal direction (the arrow A direction), and the lower side fixing portions 48b are arranged to be parallel with the vertical direction (the arrow C direction).

As illustrated in FIG. 4, mount portions 56a and 56b are fixed to both ends of the bracket 34 in the vehicle width direction (the arrow B direction). The mount portions 56a and 56b are in plate shapes and are provided with respective pairs of bolt portions (second fixing points) 58a and 58b. The mount portion 56a is provided with bolt portions (first fixing points) 60a and 60b that are separated outward from the pair of bolt portions 58a.

The two bolt portions 58a are inserted in the hole portions 46a and 41a, and nuts 61 are screwed with ends of the bolt portions 58a. The two other bolt portions 58b are inserted in the hole portions 46b and 41b, and the nuts 61 are screwed with ends of the bolt portions 58b. The DC-DC converter 28 is integrally fastened to the bracket 34 together with the duct member 40 by the same bolt portions 58a and 58b.

Figure 5:
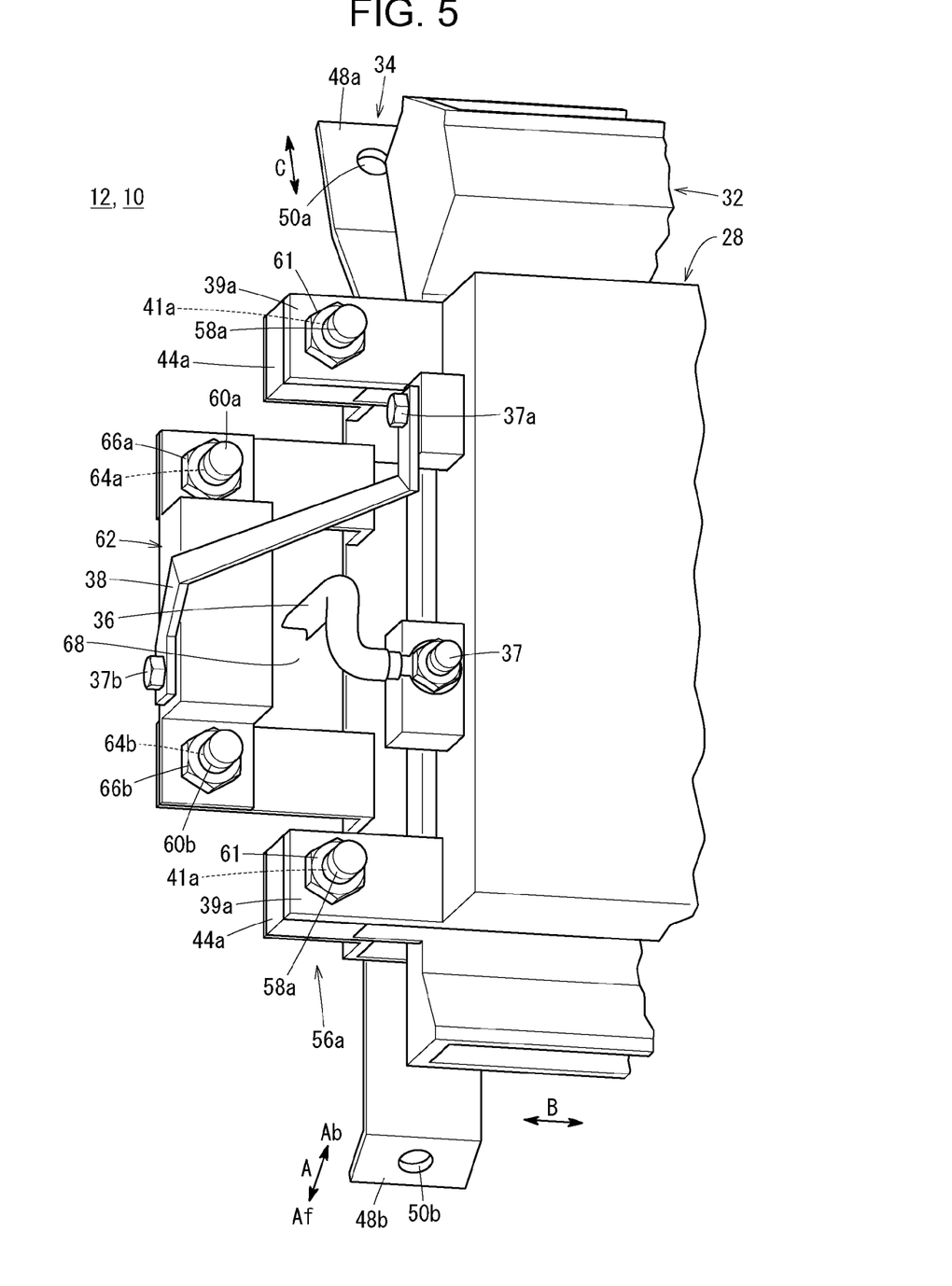
FIG. 5 is a perspective explanation diagram of principal components of the electrical unit.

A relay terminal block 62 is positioned in an intermediate portion of the low-voltage electrical circuit and on an outer side of the vehicle than the DC-DC converter 28 and is electrically connected with the mount portion 56a. As illustrated in FIG. 5, the other end of the busbar 38 is connected with the relay terminal block 62 via a bolt 37b, and hole portions 64a and 64b are formed in the relay terminal block 62. The bolt portion 60a and 60b are inserted in the hole portions 64a and 64b, and nuts 66a and 66b are screwed with ends of the bolt portions 60a and 60b, and the relay terminal block 62 is thereby fixed to the mount portion 56a.

Figure 6:
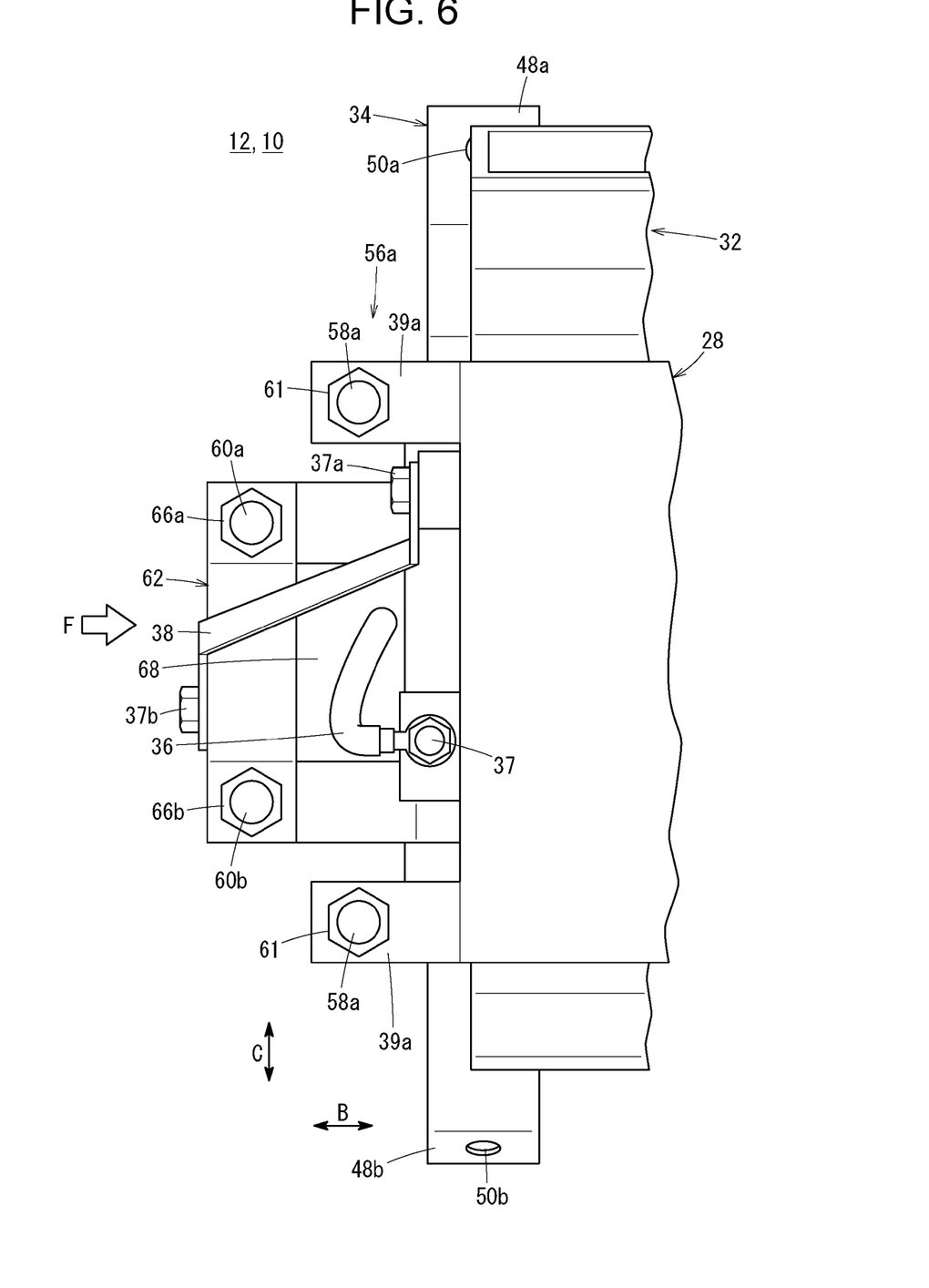
FIG. 6 is a plan explanation diagram of principal components of the electrical unit.

As illustrated in FIGS. 5 and 6, the high-voltage cable 36 passes through a space 68 that is formed between the relay terminal block 62 and the DC-DC converter 28 in a plan view from above of the vehicle. The space 68 is formed in an area that is surrounded by a connecting portion (the bolt 37b) between the busbar 38 and the relay terminal block 62, a connecting portion (the bolt 37a) between the busbar 38 and the DC-DC converter 28, the first fixing points (the bolt portions 60a and 60b), and the second fixing points (the bolt portions 58a and 58a).

As illustrated in FIG. 2, the battery module 26 is fastened by the screws to the upper frame 22a and the lower frame 22b via bracket members 70a and 70b and is thereby fixed to the vehicle frame 22. The battery module 26 is configured by laminating high-voltage batteries.

The junction box 30a is provided with a DC cable 72 that is connected with the DC-DC converter 28 and an inverter (another electrical apparatus), which is not illustrated. The junction box 30a is provided with a cable 74, which is connected with an air conditioner and so forth, which are not illustrated. The junction box 30b is provided with battery cables 76a and 76b that are connected with the battery module 26.

As illustrated in FIG. 3, the electrically driven vehicle 10 configured as described above includes the bracket 34 that integrally fixes the DC-DC converter 28 and the relay terminal block 62 to the vehicle frame 22. As illustrated in FIGS. 5 and 6, the first fixing points (the bolt portions 60a and 60b) between the bracket 34 and the relay terminal block 62 are provided on an outer side than the second fixing points (the bolt portions 58a and 58a) between the bracket 34 and the DC-DC converter 28.

Here, the DC-DC converter 28 and the relay terminal block 62 are connected together via the busbar (the low-voltage conductor) 38. Further, the space 68 is formed in the area that is surrounded by the connecting portion (the bolt 37b) between the busbar 38 and the relay terminal block 62, the connecting portion (the bolt 37a) between the busbar 38 and the DC-DC converter 28, the first fixing points (the bolt portions 60a and 60b), and the second fixing points (the bolt portions 58a and 58a).

Thus, the high-voltage cable 36 passes through the space 68 that is formed between the relay terminal block 62 and the DC-DC converter 28 in a plan view from above of the vehicle. Accordingly, the high-voltage cable 36 is covered by the relay terminal block 62 and the DC-DC converter 28. For example, in a case where an external load is applied to the electrically driven vehicle 10 in a lateral direction, the external load is not directly applied to the high-voltage cable 36.

Specifically, as illustrated in FIG. 6, in a case where an external load F is applied to the electrically driven vehicle 10 in a lateral direction, the external load F is received by the relay terminal block 62 and the busbar 38. This provides an effect of enabling the high-voltage cable 36 to be properly protected in an economical and compact configuration in which a separate protection structure for the high-voltage cable 36 is not requested.

In this embodiment, a configuration is employed in which the high-voltage cable 36 connected with the DC-DC converter 28 is protected. However, configurations are not limited to this. For example, the DC cable 72 or the like connected with the junction box 30a or 30b may be protected by a similar configuration.

The present disclosure relates to an electrically driven vehicle that is driven by at least a motor. The electrically driven vehicle includes a first electrical apparatus, a second electrical apparatus, and a relay terminal block, which are mutually adjacently arranged. The first electrical apparatus is connected with a third electrical apparatus that is separately arranged from the first electrical apparatus via a low-voltage electrical circuit, and the relay terminal block is positioned in an intermediate portion of the low-voltage electrical circuit and on an outer side of the vehicle than the first electrical apparatus and is electrically connected with the first electrical apparatus.

Further, a high-voltage cable is connected with at least the second electrical apparatus or the first electrical apparatus, and the high-voltage cable passes through a space that is formed between the relay terminal block and the first electrical apparatus in a plan view from above of the vehicle.

Further, the electrically driven vehicle preferably includes a bracket that integrally fixes the first electrical apparatus and the relay terminal block to a vehicle frame, and a first fixing point between the bracket and the relay terminal block is preferably provided on an outer side than a second fixing point between the bracket and the first electrical apparatus. In such a case, the first electrical apparatus and the relay terminal block are preferably connected together via a low-voltage conductor. Further, the space is preferably formed in an area that is surrounded by a connecting portion between the low-voltage conductor and the relay terminal block, a connecting portion between the low-voltage conductor and the first electrical apparatus, the first fixing point, and the second fixing point.

In addition, the low-voltage conductor is preferably a busbar.

In the present disclosure, the high-voltage cable passes through the space that is formed between the relay terminal block and the first electrical apparatus in a plan view from above of the vehicle. Thus, the high-voltage cable is covered by the relay terminal block and the first electrical apparatus along the horizontal direction. For example, in a case where an external load is applied to the electrically driven vehicle, the external load is not directly applied to the high-voltage cable. This enables the high-voltage cable to be properly protected in an economical and compact configuration in which a separate protection structure for the high-voltage cable is not requested.

Obviously, numerous modifications and variations of the present invention are possible in light of the above teachings. It is therefore to be understood that within the scope of the appended claims, the invention may be practiced otherwise than as specifically described herein.

What is claimed is:

1. An electrically driven vehicle that is driven by at least a motor, the electrically driven vehicle comprising:
a first electrical apparatus; a second electrical apparatus; and a relay terminal block, which are mutually adjacently arranged,
wherein the first electrical apparatus is connected with a third electrical apparatus that is separately arranged from the first electrical apparatus via a low-voltage electrical circuit,
the relay terminal block is positioned in an intermediate portion of the low-voltage electrical circuit and on an outer side of the vehicle than the first electrical apparatus and is electrically connected with the first electrical apparatus,
a high-voltage cable is connected with at least the second electrical apparatus or the first electrical apparatus, and
the high-voltage cable passes through a space that is formed between the relay terminal block and the first electrical apparatus in a plan view from above of the vehicle.

2. The electrically driven vehicle according to claim 1, further comprising:
a bracket that integrally fixes the first electrical apparatus and the relay terminal block to a vehicle frame,
wherein a first fixing point between the bracket and the relay terminal block is provided on an outer side than a second fixing point between the bracket and the first electrical apparatus,
the first electrical apparatus and the relay terminal block are connected together via a low-voltage conductor, and
the space is formed in an area that is surrounded by a connecting portion between the low-voltage conductor and the relay terminal block, a connecting portion between the low-voltage conductor and the first electrical apparatus, the first fixing point, and the second fixing point.

3. The electrically driven vehicle according to claim 2, wherein the low-voltage conductor is a busbar.

4. The electrically driven vehicle according to claim 1, further comprising a cooling structure provided between the first electrical apparatus and the second electrical apparatus.

5. The electrically driven vehicle according to claim 4, wherein the first electrical apparatus, the second electrical apparatus, the relay terminal block, and the cooling structure are provided in an electrical unit.

6. The electrically driven vehicle according to claim 5, wherein
the electrically driven vehicle is driven by at least a motor, and
the electrical unit is connected with motor.

7. The electrically driven vehicle according to claim 5, wherein
the electrical unit is provided in a rear of a seat of the electrically driven vehicle.

8. An electrically driven vehicle comprising:
a first electrical apparatus;
a second electrical apparatus;
a low-voltage electrical circuit connected to the first electrical apparatus;
a relay terminal block positioned in the low-voltage electrical circuit so as to be electrically connected to the first electrical apparatus, a space being provided between the relay terminal block and the first electrical apparatus;
a high-voltage cable connected to at least one of the second electrical apparatus and the first electrical apparatus and provided to pass through the space; and
a bracket that mounts the first electrical apparatus and the second electrical apparatus to a vehicle frame, the first electrical apparatus being provided on a first surface side of the bracket and the second electrical apparatus being provided on a second surface side of the bracket that is opposite to the first surface side.

9. The electrically driven vehicle according to claim 8, wherein the bracket integrally fixes the first electrical apparatus and the relay terminal block to the vehicle frame, wherein a first fixing point between the bracket and the relay terminal block is provided on an outer side than a second fixing point between the bracket and the first electrical apparatus, the first electrical apparatus and the relay terminal block are connected together via a low-voltage conductor, and the space is formed in an area that is surrounded by a connecting portion between the low-voltage conductor and the relay terminal block, a connecting portion between the low-voltage conductor and the first electrical apparatus, the first fixing point, and the second fixing point.

10. The electrically driven vehicle according to claim 9, wherein the low-voltage conductor is a busbar.

11. An electrically driven vehicle comprising:
a first electrical apparatus;
a second electrical apparatus;
a low-voltage electrical circuit connected to the first electrical apparatus;
a relay terminal block positioned in the low-voltage electrical circuit so as to be electrically connected to the first electrical apparatus;
a high-voltage cable connected to at least one of the second electrical apparatus and the first electrical apparatus; and
a bracket that mounts the first electrical apparatus and the relay terminal block to a vehicle frame, the relay terminal block is attached to the bracket by mount portions,
wherein a space is provided between the relay terminal block and the first electrical apparatus and between the mount portions, and
wherein the high-voltage cable is provided to pass through the space.

* * * * *